(12) United States Patent
Kitanaka (10) Patent No.: US 8,596,434 B2
(45) Date of Patent: Dec. 3, 2013

(54) ELECTRIC RAILWAY SYSTEM

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 186 days.

(21) Appl. No.: 12/936,837

(22) PCT Filed: Apr. 30, 2008

(86) PCT No.: PCT/JP2008/058278
§ 371 (c)(1),
(2), (4) Date: Oct. 7, 2010

(87) PCT Pub. No.: WO2009/133608
PCT Pub. Date: Nov. 5, 2009

(65) Prior Publication Data
US 2011/0030574 A1  Feb. 10, 2011

(51) Int. Cl.
*B60L 9/08* (2006.01)
*B60L 11/00* (2006.01)
*B61C 3/02* (2006.01)

(52) U.S. Cl.
USPC ............ 191/2; 191/8; 191/50; 105/50

(58) Field of Classification Search
USPC ............ 191/2–8, 45 R, 50; 105/49, 50
See application file for complete search history.

(56) References Cited

U.S. PATENT DOCUMENTS

| | | | | |
|---|---|---|---|---|
| 4,745,997 A | * | 5/1988 | Takei et al. | 191/87 |
| 6,557,476 B2 | * | 5/2003 | Batisse | 104/289 |
| 2002/0139629 A1 | | 10/2002 | Nogaret et al. | |
| 2007/0188127 A1 | | 8/2007 | Glasl et al. | |

FOREIGN PATENT DOCUMENTS

| | | |
|---|---|---|
| JP | 57-001003 U | 1/1982 |
| JP | 11-046402 A | 2/1999 |
| JP | 2001-352607 A | 12/2001 |
| JP | 2003-319509 A | 11/2003 |
| JP | 2005-287184 A | 10/2005 |
| JP | 2006-238652 A | 9/2006 |

(Continued)

OTHER PUBLICATIONS

International Search Report (PCT/ISA/210) issued on Aug. 12, 2008, by Japanese Patent Office as the International Searching Authority for International Application No. PCT/JP2008/058278.

(Continued)

*Primary Examiner* — Zachary Kuhfuss
(74) *Attorney, Agent, or Firm* — Buchanan Ingersoll & Rooney PC (57) ABSTRACT

An electric railway system includes an electric car and an electric-power supply device that supplies electric power to the electric car. The electric-power supply device includes a power source, and an overhead conductor portion connected to the power source. The electric car includes: a power collector installed on a roof of the electric car, having a contact conductor portion contactable to the overhead conductor portion, and being capable of raising and lowering the contact conductor portion based on an instruction from outside; a switching unit connected to the power collector, opening and closing a main circuit; an electric-power conversion device connected to the switching unit, performing an electric power conversion; an electric-power storage device connected to the electric-power conversion device; an electric motor driven by the electric-power conversion device, driving the electric car; and a control unit controlling at least the switching unit.

21 Claims, 6 Drawing Sheets

(56) References Cited

FOREIGN PATENT DOCUMENTS

| JP | 2007-060854 A | 3/2007 |
|---|---|---|
| JP | 2007-236196 A | 9/2007 |
| JP | 2007-295640 A | 11/2007 |
| KR | 2005-0068376 A | 7/2005 |
| KR | 2006-0058665 A | 5/2006 |
| RU | 2108936 C1 | 4/1998 |
| RU | 2110419 C1 | 5/1998 |
| RU | 2137622 C1 | 9/1999 |

OTHER PUBLICATIONS

Written Opinion (PCT/ISA/237) issued on Aug. 12, 2008, by Japanese Patent Office as the International Searching Authority for International Application No. PCT/JP2008/058278.

Extended Search Report from European Patent Office issued in corresponding European Patent Application No. 08740946.2 dated Sep. 22, 2011.

Office Action from Korean Patent Office issued in corresponding Korean Patent Application No. 10-2010-7024217 dated Oct. 12, 2011.

Office Action (Decision on Grant) dated Jan. 27, 2012, issued in the corresponding Russian Patent Application No. 2010148788, and an English Translation thereof. (15 pages).

The Decision of Patent Grant (Notice of Allowance) from Korean Patent Office dated May 22, 2012, issued in corresponding Korean Patent Application No. 10-2010-7024217.

Office Action from Chinese Patent Office dated May 16, 2013, issued in corresponding Chinese Patent Application No. 200880128981.0, with English translation thereof.

* cited by examiner

ELECTRIC RAILWAY SYSTEM

TECHNICAL FIELD

The present invention relates to an electric railway system configured to include an electric car and an electric-power supply device that supplies electric power to the electric car.

BACKGROUND ART

Generally, an electric car is configured to run by taking in electric power from an overhead catenary with a power collector, and by driving an electric motor using the electric power from the overhead catenary.

In recent years, because performance of electric-power storage elements such as a secondary battery and an electric double-layer capacitor has been improved, developments of systems that drive an electric motor by using electric power of these electric-power storage elements have been progressed by installing these electric-power storage elements on the electric car.

As types of these systems, a partial overhead-catenary free system, a complete overhead-catenary free system, and the like are being studied. According to the partial overhead-catenary free system, from a scenery viewpoint, an overhead catenary is removed from a part of a section of an existing electrified route, or only a route-extended portion of an existing electrified route is set as overhead catenary free. When an electric car runs in a section having an overhead catenary, the electric car uses electric power from the overhead catenary, and when the electric car runs in an overhead-catenary free section, the electric car runs using electric power from electric-power storage elements. According to the complete overhead-catenary free system, overhead catenaries are removed from all routes, and an electric car runs using only electric power from electric-power storage elements. A power source for an electric charge and an overhead catenary are provided at only terminal stations and intermediate stop stations. Electric power taken in from this overhead catenary is charged to the electric-power storage elements (for example, Patent Document 1).

Patent Document 1: Japanese Patent Application Laid-open No. 2006-238652

An example of running of an electric car in a partial overhead-catenary free system or in a complete overhead-catenary free system as explained above is explained. In a section having an overhead catenary, an electric car raises a pantograph as a power collector, and runs as an existing electric railway by collecting electric power from an overhead catenary as an overhead conductor portion. In a section having no overhead catenary, the electric car lowers the pantograph, and runs using electric power of electric-power storage elements. To complement electric power consumed in the section having no overhead catenary, the electric car raises the pantograph and quickly charges electric power to the electric power storage elements from the overhead catenary provided to charge electric power, during a few dozens of seconds to a few minutes while the electric car is stopped at a station and the like.

DISCLOSURE OF INVENTION

Problem to be Solved by the Invention

When electric power is rapidly charged to the electric-power storage elements as described above, electric power taken in from the pantograph usually becomes larger than electric power at a normal running time. Therefore, because a large current is conducted to the pantograph, it is important to keep a satisfactory contact state between the pantograph and the overhead catenary.

A case that an abnormality is present in a contact state between a pantograph and an overhead catenary is considered here. For example, when a contact resistance between the pantograph and the overhead catenary increases, the temperature at a contact portion between the pantograph and the overhead catenary increases, and this has a risk of fusing this portion.

When a pantograph is separated from an overhead catenary by an influence of snowfall or the like, this has a risk of generating an arc between the pantograph and the overhead catenary and damaging the pantograph and the overhead catenary at a high temperature, and also has a risk of burning surrounding devices. Because of these, it is necessary to quickly detect an abnormality in a contact state between the pantograph and the overhead catenary, and take action to stop an electric charge.

The present invention has been achieved in view of the above problems, and an object of the present invention is to provide an electric railway system suitable for each mode of running in a section having no overhead catenary, an electric charge to electric-power storage elements while an electric car is stopped, and running in a section having an overhead catenary, and particularly, capable of stably and safely performing a rapid electric charge to the electric-power storage elements while the electric car is stopped.

Means for Solving Problem

To solve above-mentioned problems and to achieve the object, an electric railway system is configured to comprise an electric car and an electric-power supply device that supplies electric power to the electric car. The electric-power supply device comprises a power source, and an overhead conductor portion connected to the power source. The electric car comprises a power collector that is installed on a roof of the electric car, has a contact conductor portion contactable to the overhead conductor portion, and is capable of performing a raising operation and a lowering operation of the contact conductor portion based on an instruction from outside, a switching unit that is connected to the power collector and performs opening and closing of a main circuit as a supply route of electric power, an electric-power conversion device that is connected to the switching unit and performs an electric power conversion, an electric-power storage device that is connected to the electric-power conversion device and stores electric power, an electric motor that is driven by the electric-power conversion device and drives the electric car, and a control unit that controls at least the switching unit.

Effect of the Invention

The electric railway system according to the present invention can provide an electric railway system suitable for each mode of running of an electric car in a section having no overhead catenary, an electric charge to electric-power storage elements while an electric car is stopped, and running of the electric car in a section having an overhead catenary, and particularly, capable of stably and safely performing a rapid electric charge to electric-power storage elements while the electric car is stopped.

EXPLANATIONS OF LETTERS OR NUMERALS 1A, 1B Overhead catenary
2A, 2B Pantograph
3 Wheel
4 Rail
5 State detector
6 Temperature detector
10 Electric car
11 Switching unit
12 Electric-power conversion device
13 Electric-power storage device
15 Control unit
16 Electric motor
17 Voltage detector
20 Pantograph-voltage-abnormality determining unit
21 Reactor-voltage-abnormality determining unit
22 Temperature determining unit
23 Raise/lower determining unit
24 Welding determination unit
25 NAND circuit
26 Compulsory-lower control unit
27 OR circuit
28 AND circuit
29 OR circuit
30 Delay circuit
31 NAND circuit
32, 33 AND circuit
40 Reactor
41 Capacitor
42 Voltage detector
50 Station
60 Contact conductor portion
61 Frame
62 Linkage mechanism
70 Power source

BEST MODE(S) FOR CARRYING OUT THE INVENTION

Exemplary embodiments of an electric railway system according to the present invention will be explained below in detail with reference to the accompanying drawings. The present invention is not limited thereto.

Embodiment

Figure 1:
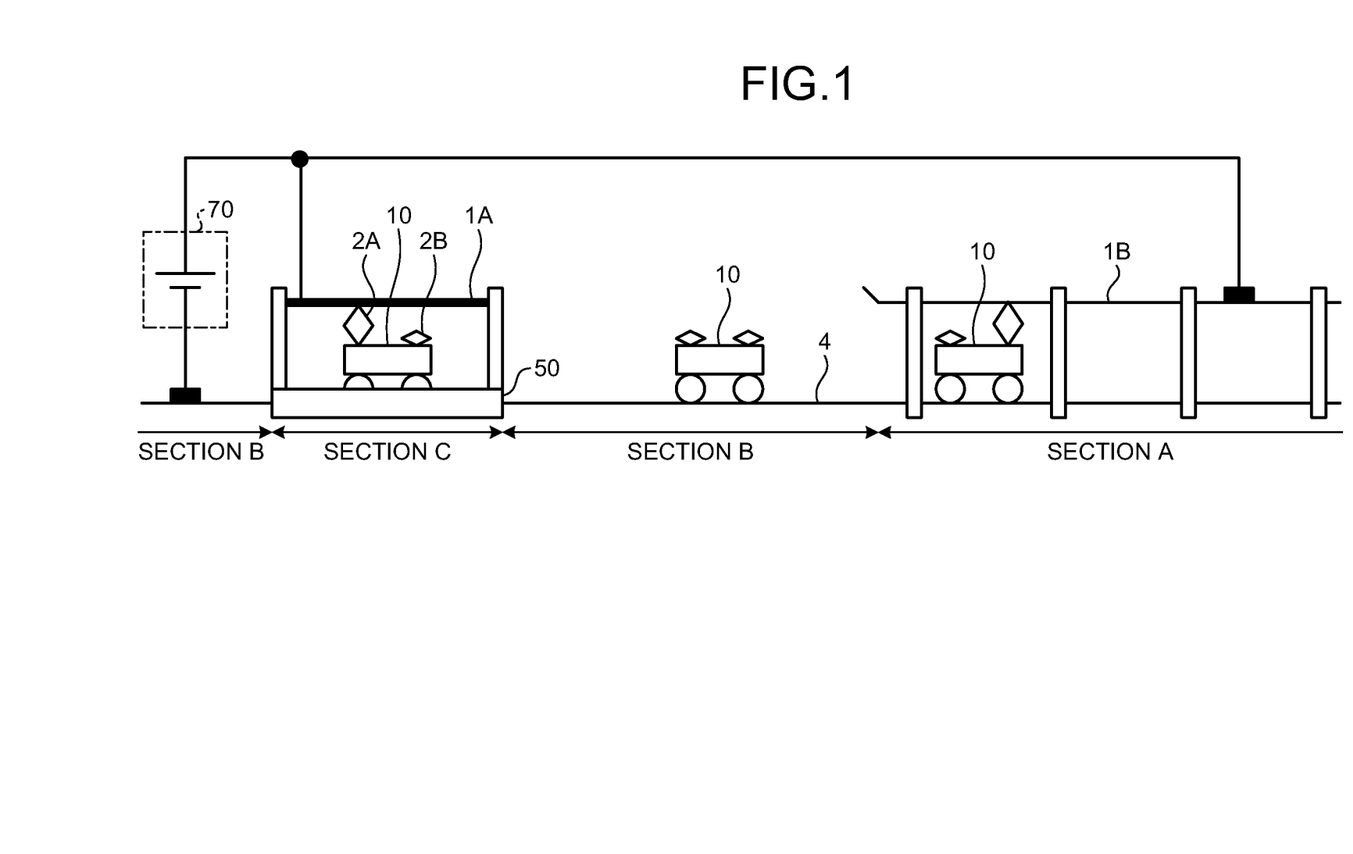
FIG. 1 is a configuration example of an electric railway system according to an embodiment of the present invention.

FIG. 1 is a configuration example of an electric railway system according to an embodiment of the present invention. As shown in FIG. 1, an apparatus installed on the ground includes a rail 4 on which an electric car 10 runs, an overhead catenary 1A as an overhead conductor portion for a rapid electric charge provided at a station 50, an overhead catenary 1B provided in a normal electrified section, and an electric power substation 70 as a power source to the electric car 10, connected to the overhead catenary 1A and the overhead catenary 1B.

Although the electric power substation 70 is shown by a simple mark of a direct-current voltage source in FIG. 1, the electric power substation 70 is generally configured to decrease a special high-voltage alternate current received from an electric-power system, and supply a voltage of a direct current about 600 volts to 1500 volts rectified by a rectifier to the overhead catenary 1A or the overhead catenary 1B. The overhead catenary 1A and the overhead catenary 1B can be configured to receive electric power from separate electric power substations (not shown), respectively.

The overhead catenary 1B is used for the electric car 10 to collect electric power while running. Therefore, the overhead catenary 1B is generally configured to be supported above the rail 4 with supporting pillars having a trolley catenary, configured by materials based on copper, provided at constant intervals, to improve the following capability of the pantograph. The overhead catenary 1A is used for the electric car 10 to collect electric power in a stopped state, and a large amount of current flows with a accompanying rapid electric charge. Therefore, for the overhead catenary 1A, it is preferable to use a rigid overhead catenary based on a copper sheet having a large cross-sectional area and high rigidity.

The electric car 10 is installed with a pantograph 2A as a power collector for a rapid electric charge, and a pantograph 2B as a power collector for an existing electrified section. Details of the electric car 10 are described later.

A section A is a normal electrified section, and the electric car 10 runs in this section while receiving electric power from the overhead catenary 1B by raising the pantograph 2B. A section B is an overhead catenary free section, and the electric car 10 runs in this section by using electric power from the electric-power storage elements installed in the electric car 10 by lowering and storing the pantographs 2A and 2B. A section C is a rapid-electric-charge overhead-catenary section, and the electric car 10 charges electric power corresponding to electric power consumed while running in the section B, into the electric-power storage elements installed in the electric car 10. In this case, the section C is assumed as a station and an exclusive electric-charge section, where the electric car 10 keeps stopping and charges electric power by raising the pantograph 2A.

Figure 2:
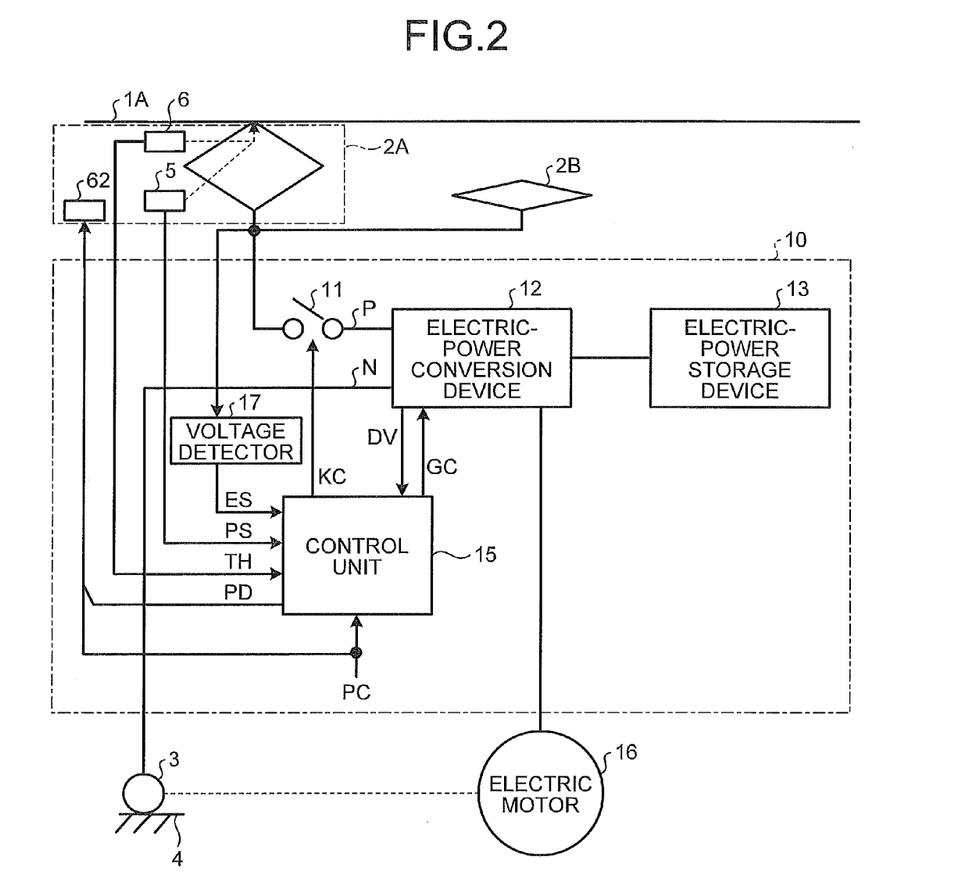
FIG. 2 is a configuration example of an electric car according to the embodiment of the present invention.
Figure 3:
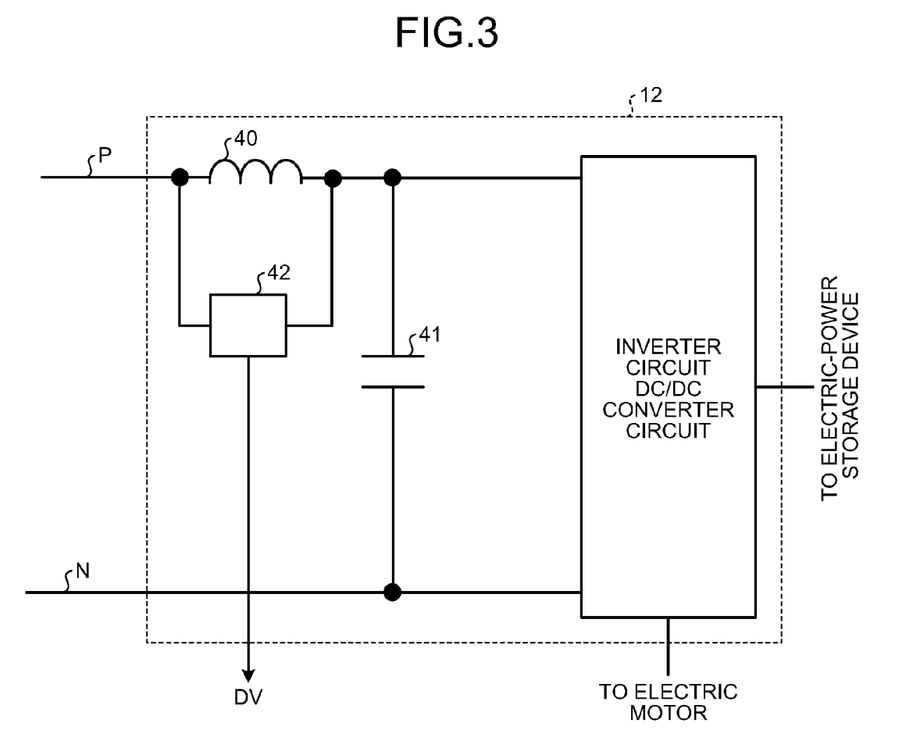
FIG. 3 is a configuration example of an electric-power conversion device 12 according to the embodiment of the present invention.

FIG. 2 is a configuration example of the electric car 10 according to the embodiment of the present invention. FIG. 3 is a configuration example of an electric-power conversion device 12 according to the embodiment of the present invention. As shown in FIG. 2, the electric car 10 is installed with the pantograph 2A for a rapid electric charge, and the pantograph 2B for collecting electric power in an existing electrified section. The pantographs 2A and 2B are configured to be able to be selectively raised or lowered. Although both pantographs are electrically connected to each other in FIG. 2, the pantographs can be configured such that their connection is switched over according to a necessity instead of being always connected.

The pantograph 2A is provided with a temperature detector 6 that measures a temperature of a contact conductor portion 60 (see FIG. 4 described later) contacted to the overhead catenary 1A, and a state detector 5 that detects a raise/lower state of the pantograph 2A. A temperature detection signal TH from the temperature detector 6, and a state detection signal PS from the state detector 5 are input to a control unit 15, respectively. A switching unit 11 configured by a switch or a breaker that opens or closes a main circuit as an electric-power supply path is connected to the pantograph 2A. The electric-power conversion device 12 is arranged at a latter stage of the switching unit 11.

As shown in FIG. 3, the electric-power conversion device 12 has an input filter circuit including a reactor 40 and, a capacitor 41, and a voltage detector 42 that detects a voltage of the reactor 40 and outputs the detected voltage to the control unit 15 as a reactor voltage DV. A DC/DC converter circuit and an inverter circuit are connected to a latter stage of the input filter circuit. The DC/DC converter circuit and the inverter circuit are configured by a known technique, and detailed explanations thereof will be omitted. The present invention is not limited by configurations of the DC/DC converter circuit and the inverter circuit.

In FIG. 2, an output side of the electric-power conversion device 12 is connected to an electric-power storage device 13 and an electric motor 16.

The electric-power storage device 13 is configured to incorporate electric-power storage elements such as secondary batteries of lithium-ion batteries and nickel-hydrogen batteries, and electric double-layer capacitors. The electric-power storage device 13 is configured to perform an electric charge via the electric-power conversion device 12 by electric power received via the pantograph 2A or the pantograph 2B, supply stored electric power to the electric motor 16 via the electric-power conversion device 12, and drive wheels 3. The present invention is not limited by a kind of electric-power storage element.

A voltage detector 17 is provided at a latter stage of the pantograph 2A, and is configured to input a pantograph voltage ES detected, to the control unit 15.

The control unit 15 is input with a pantograph raise/lower instruction PC from outside, and is input with the temperature detection signal TH, the state detection signal PS, and the pantograph voltage ES, from the pantograph 2A. A detected value of a reactor voltage DV is input to the control unit 15 by the electric-power conversion device 12. The control unit 15 outputs an on/off signal KC to the switching unit 11, outputs a control signal GC to the electric-power conversion device 12, and outputs a compulsory-lower signal PD to the pantograph 2A. The control signal GC includes current instructions to adjust a current in the DC/DC converter circuit and the inverter circuit, and respective on/off signals. A detailed configuration and an operation example of the control unit 15 are explained later.

Figure 4A:
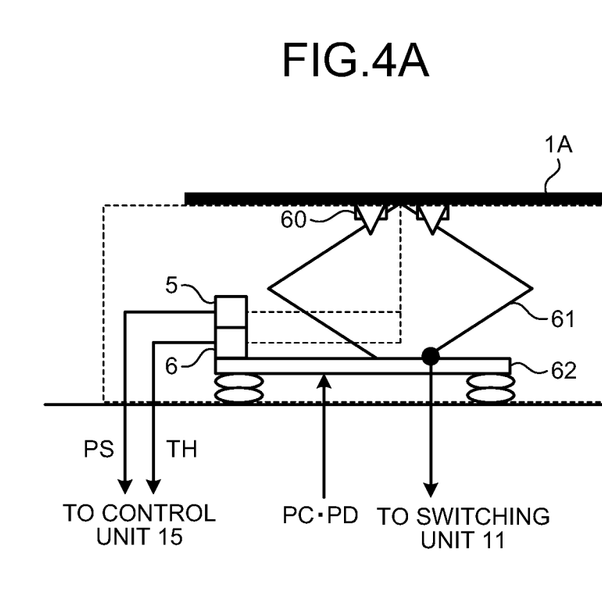
FIGS. 4A and 4B are configuration examples of a pantograph 2A and an overhead catenary 1A according to the embodiment of the present invention.
Figure 4B:
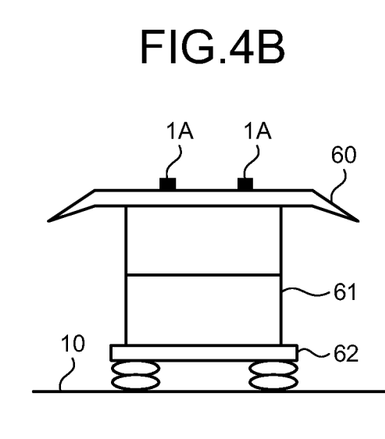

FIGS. 4A and 4B are configuration examples of the pantograph 2A and the overhead catenary 1A according to the embodiment of the present invention. As shown in FIGS. 4A and 4B, the pantograph 2A as a power collector includes a linkage mechanism 62, a frame 61 configured by a conductor, a contact conductor portion 60 electrically connected to the frame 61, the state detector 5, and the temperature detector 6.

The pantograph 2A has a configuration similar to that of the pantograph 2B except a difference described below.

An operation of the pantograph 2A is explained below. When the pantograph raise/lower instruction PC input from outside is a raise instruction, the linkage mechanism 62 raises the frame 61 by using a spring, an air pressure, a motorized force or the like, contacts the contact conductor portion 60 provided at a top portion of the frame 61 to the overhead catenary 1A, and obtains electric power. When the pantograph raise/lower instruction PC input from outside is a lower instruction, the linkage mechanism 62 lowers the frame 61 by using a spring, an air pressure, a motorized force or the like, and breaks a contact between the contact conductor portion 60 provided at the top portion of the frame 61 and the overhead catenary 1A.

The compulsory-lower signal PD is input from the control unit 15. When the compulsory-lower signal PD is input, the linkage mechanism 62 quickly lowers the frame 61 by using a spring, an air pressure, a motorized force or the like, and breaks a contact between the contact conductor portion 60 provided at the top portion of the frame 61 and the overhead catenary 1A.

The state detector 5 detects a raise/lower state of the contact conductor portion 60. For example, when the state detector 5 determines that the contact conductor portion 60 has reached the overhead catenary 1A and contacted thereto, the state detector 5 sets the state detection signal PS ON. On the other hand, when the state detector 5 determines that a contact between the contact conductor portion 60 and the overhead catenary 1A has been broken, the state detector 5 sets the state detection signal PS OFF. A contact state can be determined by detecting a positional relationship between the contact conductor portion 60 and the overhead catenary 1A or by detecting a contact pressure. There is no limit to a method of this detection.

The state detection signal PS can be a signal indicating a detected position itself of the contact conductor portion 60. In this case, the control unit 15 determines whether the contact conductor portion 60 has reached the overhead catenary 1A or a contact has been broken.

The temperature detector 6 measures the temperature of the contact conductor portion 60, and sets the temperature detection signal TH ON when the temperature exceeds a predetermined set value, for example. The temperature detector 6 sets the temperature detection signal TH OFF when the temperature of the contact conductor portion 60 becomes equal to or lower than a predetermined value.

The temperature detection signal TH can be a signal indicating a detected temperature itself of the contact conductor portion 60. In this case, the control unit 15 determines whether a detected temperature is equal to or higher or lower than a predetermined value.

A difference between the pantograph 2A and the pantograph 2B is explained. For a material of a portion of the contact conductor portion 60 set in the pantograph 2B, contacted to the overhead catenary, a carbon material having a smaller friction coefficient to the overhead catenary than that of copper is used. However, for a material of a portion of the contact conductor portion 60 set in the pantograph 2A contacted to the overhead catenary, it is preferable to use a copper alloy or the like having a high electric conductivity and a high melting point.

There is also a difference between linkage mechanisms 62. The linkage mechanism 62 set in the pantograph 2A has a larger lifting force of the contact conductor portion 60 than that a linkage mechanism set in the pantograph 2B has. The linkage mechanism 62 set in the pantograph 2A secures a higher contact pressure between the contact conductor portion 60 and the overhead catenary 1A than that the linkage mechanism set in the pantograph 2B has.

Reasons for the above configuration are explained below. Because the pantograph 2B is used while the electric car is running as described above, the following points are preferably taken into consideration. Because the pantograph 2B collects electric power by sliding the contact conductor portion 60 with the overhead catenary 1B during running of the electric car 10, it is important to avoid abrasion of the overhead catenary 1B. Therefore, it becomes a preferable condition to use a carbon material having a small friction coefficient, at a portion of the contact conductor portion 60 contacting the overhead catenary 1B.

Because a carbon material has a larger electric resistance than that of copper and also because a current loss due to a current conduction is larger, an amount of heat generation at a contact point between the overhead catenary 1B and the contact conductor portion 60 becomes large.

However, because the electric car 10 collects electric power while running, cooling of the contact conductor portion 60 by air resistance can be expected. Further, because a heat generation position always shifts along a move of the electric car 10, a heat generation position is not fixed at the same position, and this has no problem.

On the other hand, because the pantograph 2A is used while the electric car is stopped as described above, the following point is preferably taken into consideration. Because the pantograph 2A collects electric power from the overhead catenary 1A while the electric car 10 is stopped, the overhead catenary 1A is not abraded.

However, during a rapid electric charge, because a contact point between the contact conductor portion 60 and the overhead catenary 1A is fixed, heat generation at the contact point needs to be minimized, and it becomes important to minimize a contact electric resistance. Therefore, a copper alloy having a satisfactory electric conductivity is used. It becomes preferable to use a copper alloy having a high melting temperature to avoid reaching a melting loss even when the temperature at the contact point increases.

There is a risk that the stability of an electric contact at the contact point is lost by the influence of an external environment. Specifically, when snow is deposited on an upper part of the contact conductor portion 60 in winter and a lifting force of the contact conductor portion 60 to the overhead catenary 1A decreases due to a weight of the deposited snow, and also when a position near a contact point between the overhead catenary 1A and the contact conductor portion 60 is stained with powder dusts and bird droppings, there is a risk that a contact resistance at the contact point becomes large and a amount of heat generation increases.

Therefore, it becomes a preferable condition that the linkage mechanism 62 set in the pantograph 2A has a larger lifting force of the contact conductor portion 60 than that the linkage mechanism of the pantograph 2B has. When a contact pressure between the contact conductor portion 60 and the overhead catenary 1A is set larger than that of the pantograph 2B, an electric contact between the contact conductor portion 60 and the overhead catenary 1A can be set more secure.

In the pantograph 2B used while the electric car is running, a foreign material is removed from between the contact conductor portion 60 and the overhead catenary 1B by a friction due to the running of the electric car, and there is no risk of snow deposit. Therefore, the stability of an electric contact can be secured without an unnecessarily large contact pressure between the contact conductor portion 60 and the overhead catenary 1B.

In the pantograph 2B, when a lifting force of the frame 61 is set large, a frictional force with the overhead catenary 1B becomes large, and abrasion of the overhead catenary 1B increases, and an amount of the lifting applied to the overhead catenary 1B toward the above increases. Accordingly, this has a risk of contacting the overhead catenary 1B to a structure (for example, a bridge over railway) provided above the overhead catenary 1B. Consequently, it becomes necessary to take measure to increase the tensile force of the overhead catenary 1B. Therefore, it is not preferable to set too large the lifting force in the contact conductor portion 60 of the pantograph 2B.

The overhead catenary 1A is explained next. As shown in FIG. 4B, two overhead catenaries 1A are provided in parallel in a proceeding direction of the electric car 10, and each of the overhead catenaries 1A is configured to be contacted to the contact conductor portion 60. The number of the overhead catenaries is not limited to two as shown in FIGS. 4A and 4B, and can be plural, which is larger than two. Plural overhead catenaries 1A are electrically connected to each other, and receive a voltage supply from the electric power substation 70.

By configuring such that plural overhead catenaries 1A are contacted to the contact conductor portion 60, even when a remarkably aggravated electric-contact state occurs due to adhesion of a foreign material such as a vinyl sheet to one of the overhead catenaries 1A, for example, the rest of the overhead catenaries 1A can be contacted to the contact conductor portion 60, and a stable power collection becomes possible.

By providing plural contact conductor portions 60 of the pantograph 2A, which is equal to or larger than two (in FIGS. 4A and 4B, two conductors are shown as an example), a contact with the overhead catenary 1A can be set more secure, and electric power can be collected stably.

By providing plural pantographs 2A in the electric car 10 and by electrically connecting between the plural pantographs 2A, identical effects can be also obtained. However, when the number of pantographs installed increases, weight of the electric car 10 becomes larger, and a space is necessary on the roof. These disadvantages also need to be taken into consideration.

Although not shown in FIG. 4, the overhead catenary 1A can be configured to be able to be raised slightly above by a lifting force of the pantograph 2A. Only when the pantograph 2A is raised above by a constant amount, a position detector (not shown) can detect this, and the electric power substation 70 can apply a voltage to the overhead catenary 1A. By arranging this configuration, there is an effect that electric power can be supplied to the pantograph 2A only when a contact force is securely present between the contact conductor portion 60 and the overhead catenary 1A, and power can be collected more stably.

Figure 5:
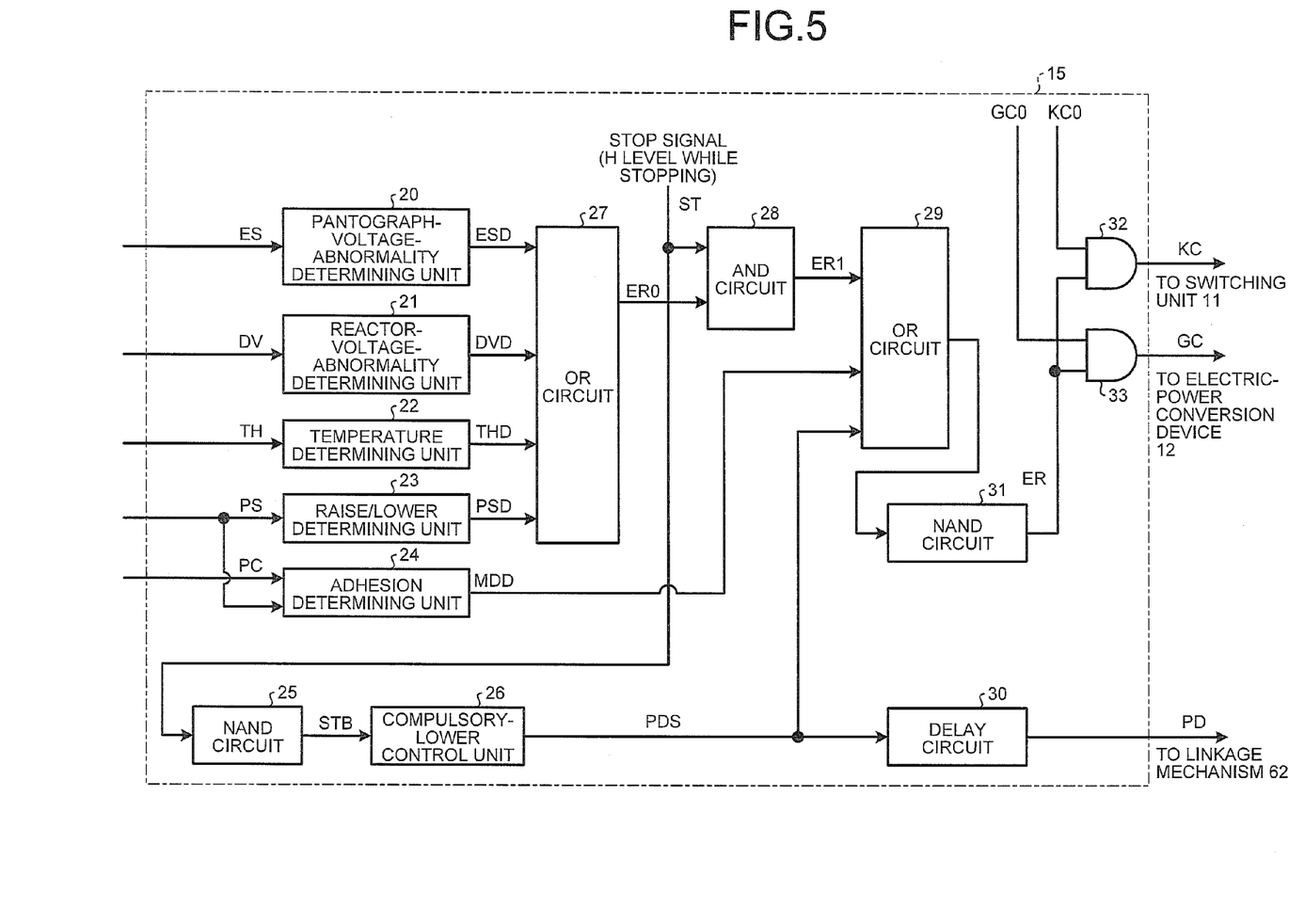
FIG. 5 is a configuration example of a control unit 15 according to the embodiment of the present invention.

A configuration of the control unit 15 is explained next. FIG. 5 is a configuration example of the control unit 15 according to the embodiment of the present invention.

As shown in FIG. 5, the control unit 15 is configured to include: a pantograph-voltage-abnormality determining unit 20 that inputs the pantograph voltage ES, determines an abnormality of the pantograph voltage ES, and outputs a result of the determination as a determination signal ESD; a reactor-voltage-abnormality determining unit 21 that inputs the reactor voltage DV, determines an abnormality of the reactor voltage DV, and outputs a result of the determination as a determination signal DVD; a temperature determining unit 22 that inputs the temperature detection signal TH of the contact conductor portion 60, determines an abnormality of temperature, and outputs a result of the determination as a determination signal THD; a raise/lower determining unit 23 that inputs the state detection signal PS, determines a raise/lower state of the pantograph 2A, and outputs a result of the determination as a determination signal PSD; a welding determination unit 24 that inputs the pantograph raise/lower instruction PC and the state detection signal PS, determines a welding state of the contact conductor portion 60 of the pantograph 2A, and outputs a result of the determination as a determination signal MDD; an OR circuit 27 that takes a logical sum of the determination signals ESD, DVD, THD, and PSD, and outputs ER0 as a result of the logical sum; an AND circuit 28 that takes a logical product of a stop signal ST indicating that the electric car 10 is stopped and ER0, and outputs ER1 as a result of the logical product; a NAND circuit 25 that takes a logical inversion of the stop signal ST, and outputs STB as a result of the logical inversion; a compulsory-lower control unit 26 that outputs a compulsory-lower basic signal PDS when STB becomes at an ON (H) level; a delay circuit 30 that inputs the compulsory-lower basic signal PDS, and delays an output of the compulsory-lower signal PD by a predetermined time; an OR circuit 29 that takes a logical sum of the output ER1 of the AND circuit 28, the determination signal MDD, and the compulsory-lower basic signal PDS; a NAND circuit 31 that logically inverts an output signal of the OR circuit 29, and outputs the determination signal ER; an AND circuit 32 that takes a logical sum of the determination signal ER and a basic on/off signal KC0 separately generated, and outputs an on/off signal KC; and an AND circuit 33 that takes a logical sum of the determination signal ER and a basic control signal GC0 separately generated, and outputs the control signal GC.

An operation of the control unit 15 having the above configuration is explained. The pantograph-voltage-abnormality determining unit 20 determines an abnormality of a contact state between the overhead catenary 1A and the contact conductor portion 60 based on the pantograph voltage ES as a physical quantity indicating a level of a contact state between the overhead catenary 1A and the contact conductor portion 60.

Figure 6:
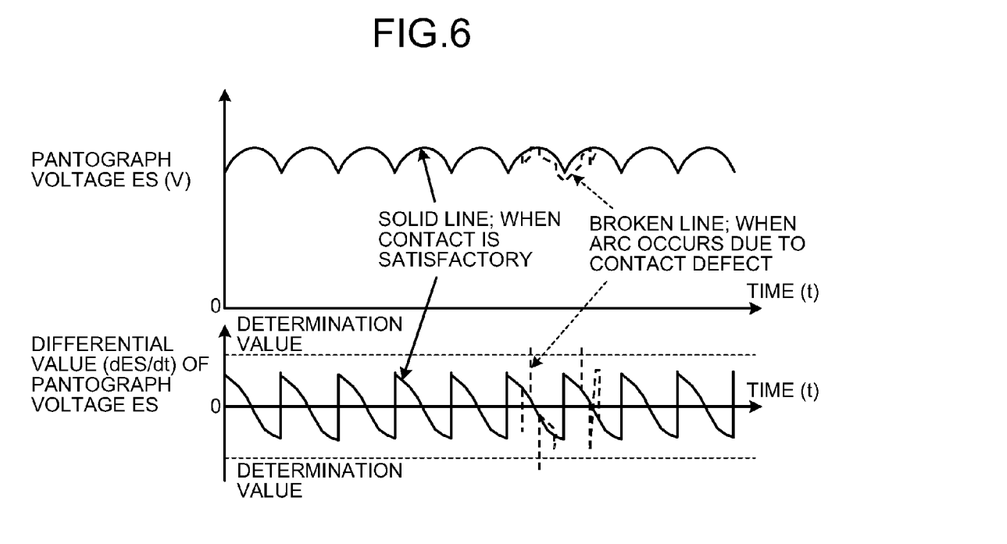
FIG. 6 is a waveform example of a pantograph voltage and a differential value thereof according to the embodiment of the present invention.

FIG. 6 is a waveform example of the pantograph voltage ES and a differential value thereof according to the embodiment of the present invention. As shown in FIG. 6, when an electric contact between the overhead catenary 1A and the contact conductor portion 60 becomes defective, a contact resistance changes or an arc occurs, and a voltage varies as shown by a broken line in FIG. 6. The pantograph-voltage-abnormality determining unit 20 obtains a differential value (a change rate) of the pantograph voltage ES, and monitors whether the differential value is within a determination value. When a differential value (a change rate) of the pantograph voltage ES takes a value other than the determination value, the pantograph-voltage-abnormality determining unit 20 determines that an electric contact between the overhead catenary 1A and the contact conductor portion 60 is defective (abnormal), and sets the determination signal ESD ON (H level).

In addition to performing an abnormality determination based on a differential value (a change rate) of the pantograph voltage ES, the pantograph-voltage-abnormality determining unit 20 can be configured to pass the pantograph voltage ES through a high-pass filter, extract a voltage variation component (a frequency component) generated due to a contact defect state, and perform an abnormality determination based on this extraction.

The reactor-voltage-abnormality determining unit 21 performs an abnormality determination of a contact state between the overhead catenary LA and the contact conductor portion 60 based on the reactor voltage DV as a physical quantity indicating a level of a contact state between the overhead catenary 1A and the contact conductor portion 60.

Figure 7:
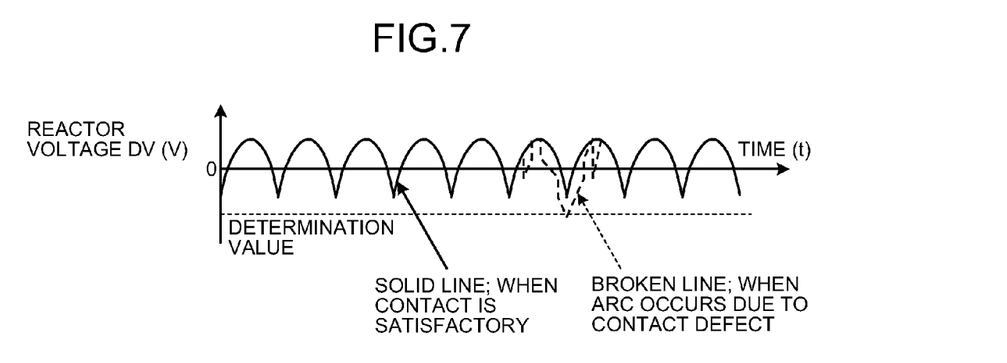
FIG. 7 is a waveform example of a reactor voltage according to the embodiment of the present invention.

FIG. 7 is a waveform example of the reactor voltage DV according to the embodiment of the present invention. As shown in FIG. 7, when an electric contact between the overhead catenary 1A and the contact conductor portion 60 becomes defective, a contact resistance changes or an arc occurs, and a voltage varies as shown by a broken line in FIG. 7. The reactor-voltage-abnormality determining unit 21 monitors whether the reactor voltage DV is within a determination value. When the reactor voltage DV takes a value other than the determination value, the reactor-voltage-abnormality determining unit 21 determines that an electric contact between the overhead catenary 1A and the contact conductor portion 60 is defective (abnormal), and sets the determination signal DVD ON (H level).

The reactor-voltage-abnormality determining unit 21 can perform an abnormality determination based on a differential value (a change rate) of the reactor voltage DVD in a similar manner to that of a process by the pantograph-voltage-abnormality determining unit 20. The reactor-voltage-abnormality determining unit 21 can be also configured to pass the reactor voltage DV through a high-pass filter, extract a voltage variation component (a frequency component) generated due to a contact defect state, and perform an abnormality determination based on this extraction. It can be configured such that at least one of the pantograph-voltage-abnormality determining unit 20 and the reactor-voltage-abnormality determining unit 21 is provided.

As another configuration, although not shown in FIG. 7, it can be configured such that a Fourier transform unit or the like analyzes a frequency included in the pantograph voltage ES or in the reactor voltage DV, and compares a result of the analysis with a characteristic of a frequency distribution generated in a state that an arc occurs. Based on a result of this comparison, the pantograph-voltage-abnormality determining unit 20 or the reactor-voltage-abnormality determining unit 21 can determine that an electric contact between the overhead catenary 1A and the contact conductor portion 60 is defective (abnormal), and set the determination signal ESD or the determination signal DVD ON (H level).

The temperature determining unit 22 sets the determination signal THD ON (H level), when the temperature detection signal TH as a physical quantity indicating a level of a contact state shows an excess temperature of the contact conductor portion 60.

The raise/lower determining unit 23 sets the determination signal PSD ON (H level), when the state detection signal PS as a physical quantity indicating a level of a contact state shows that a raise position of the contact conductor portion 60 is at or lower than a predetermined value and is not contacted to the overhead catenary 1A.

The OR circuit 27 takes a logical sum of the determination signals ESD, DVD, THD, and PSD. With this configuration, when any one of events that can occur when a contact state between the overhead catenary 1A and the contact conductor portion 60 is abnormal occurs, the OR circuit 27 determines that a contact state between the overhead catenary 1A and the contact conductor portion 60 is abnormal, and outputs a determination signal ER0.

Next, the AND circuit 28 takes a logical product of the stop signal ST indicating that the electric car 10 is stopped and the determination signal ER0, and outputs a determination signal ER1. With this configuration, a separation of the overhead catenary 1B from the pantograph 2B during running of the electric car 10 in a normal electrified section, and an unnecessary abnormal detection due to a voltage variation can be avoided, and an abnormality detection function can be set valid only when the electric car 10 is stopped.

When the determination signal ER1 is ON (H level), an electric contact state between the overhead catenary 1A and the contact conductor portion 60 is determined to be abnormal. Therefore, the determination signal ER is output via the OR circuit 29 and the NAND circuit 31. The on/off signal KC and the control signal GC are compulsively turned off, without depending on the basic on/off signal KC0 and the basic control signal GC0 generated separately. Consequently, the electric-power conversion device 12 is stopped, and a main circuit current is interrupted by turning off the switching unit 11. This configuration prevents a current from flowing to the pantograph 2A, and expansion of an abnormal range can be avoided.

After a rapid electric charge to the electric car 10 is completed, for example, when the state detection signal PS is output indicating that a contact state between the contact conductor portion 60 and the overhead catenary 1A is continued although the pantograph raise/lower instruction PC indicates to lower the pantograph, the welding determination unit 24 determines that the contact conductor portion 60 is welded to the overhead catenary 1A and the pantograph 2A cannot be lowered, and sets the determination signal MDD ON (H level).

When the determination signal MDD is set ON (H level), it is determined that the overhead catenary 1A and the contact conductor portion 60 are adhered together by an arc generated between the overhead catenary 1A and the contact conductor portion 60. The determination signal ER is output via the OR circuit 29 and the NAND circuit 31. The on/off signal KC and the control signal GC are compulsively set OFF, without depending on the basic on/off signal KC0 and the basic control signal GC0 generated separately. Consequently, a starting of the electric-power conversion device 12 (particularly, an inverter circuit) is prohibited, a current conduction to the electric motor 16 is prohibited, and the switching unit 11 is turned off to interrupt a main circuit current. With this configuration, a starting of the electric car 10 in a state that the pantograph 2A is adhered to the overhead catenary 1A can be avoided, a damage of the pantograph 2A can be voided, and expansion of damage can be avoided. A move of the electric car 10 even when a current conduction to the electric motor 16 is prohibited and even when the main circuit is disconnected by turning off the switching unit 11 is not preferable. Therefore, it is preferable to take measure to prohibit running of the electric car.

Next, the compulsory-lower control unit 26 set's the compulsory-lower basic signal PDS ON (H level), when the electric car 10 moves due to a loosened brake of the electric car 10 or by an intentional operation during a rapid electric charge to the electric car 10 by raising the pantograph 2A. Accordingly, the determination signal ER is output via the OR circuit 29 and the NAND circuit 31. The on/off signal KC and the control signal GC are compulsively set OFF, without depending on the basic on/off signal KC0 and the basic control signal GC0 generated separately. Consequently, the electric-power conversion device 12 is turned off, and the switching unit 11 is turned off to interrupt the main circuit current.

Thereafter, after a lapse of a delay time set by the delay circuit 30, the compulsory-lower signal PD is output, and the pantograph 2A is lowered. The delay time of the delay circuit 30 is set to a time required for the switching unit 11 and the electric-power conversion device 12 to become in an off state or is set to a longer time. With this arrangement, the pantograph 2A can be lowered and stored before the electric car 10 is deviated from the section C. As a result, the pantograph 2A can be avoided from being raised at a position where the overhead catenary 1A is not present, and breaking of the pantograph 2A due to a raise of the pantograph exceeding a raise limit can be avoided.

The delay circuit 30 secures a time from an on-timing of the compulsory-lower basic signal PDS until when the compulsory-lower signal PD is set ON, and a lowering of the pantograph 2A is started after the main circuit current is set to zero by stopping the electric-power conversion device 12 and the switching unit 11. Therefore, a current is not interrupted due to a disconnection of the contact conductor portion 60 of the pantograph 2A from the overhead catenary 1A, and a melting loss due to the occurrence of an arc between the pantograph 2A and the overhead catenary 1A can be avoided.

In addition to by providing the delay circuit 30, a similar effect can be also obtained by configuring an interlock circuit such that the compulsory-lower signal PD is set ON, after turning OFF of the switching unit 11 and the electric-power conversion device 12 is confirmed by receiving a feedback signal (not shown) indicating an on/off state from the switching unit 11 and the electric-power conversion device 12.

As a method of detecting an abnormality of an electric contact between the overhead catenary 1A and the contact conductor portion 60, it can be configured such that a temperature of the contact conductor portion 60 is indirectly detected by a thermo-viewer (not shown) or the like, and the determination signal THD is set ON (H level) based on this detection. Alternatively, it can be configured such that an optical sensor (not shown) detects an arc beam generated between the overhead catenary 1A and the contact conductor portion 60. When a detected value is equal to or larger than a predetermined value, the temperature of the contact conductor portion 60 is determined to be a high temperature, and the determination signal THD is set ON (H level).

According to the configuration explained in the present embodiment, the pantograph 2A used during the rapid electric charge while the electric car is stopped and the pantograph 2B used to collect electric power from the overhead catenary during running of the electric car are installed in the electric car 10. Alternatively, a separate pantograph having both characteristics of the pantograph 2A and the pantograph 2B can be shared. Needless to mention, the configuration described in the present embodiment can be applied also in this case.

When a rapid-electric-charge current is small, the pantograph 2B can be used instead of the pantograph 2A. Needless to mention, the configuration described in the present embodiment can be applied also in this case.

With the above configuration, it is possible to provide an electric railway system suitable for each mode of running of an electric car in a section having no overhead catenary, an electric charge to electric-power storage elements while an electric car is stopped, and running of the electric car in a section having an overhead catenary, and particularly, capable of stably performing a rapid electric charge to the electric-power storage elements while the electric car is stopped.

The configuration described in the above embodiment is only an example of the contents of the present invention. The configuration can be combined with other well-known techniques and it can be modified, such as omitting a part thereof, without departing from the scope of the present invention.

Industrial Applicability

As described above, the electric railway system according to the present invention is useful as an invention in which a rapid electric charge to electric-power storage elements can be stably and safely performed while an electric car is stopped.

The invention claimed is:

1. An electric railway system configured to comprise an electric car and an electric-power supply device that supplies electric power to the electric car, wherein
the electric-power supply device comprises:
a power source; and
an overhead conductor portion connected to the power source, and
the electric car comprises:
a power collector that is installed on a roof of the electric car, has a contact conductor portion contactable to the overhead conductor portion, and is capable of performing a raising operation and a lowering operation of the contact conductor portion based on an instruction;

a switching unit that is connected to the power collector and performs opening and closing of a main circuit as a supply route of electric power;

an electric-power conversion device that is connected to the switching unit and performs an electric power conversion;

an electric-power storage device that is connected to the electric-power conversion device and stores electric power;

an electric motor that is driven by the electric-power conversion device and drives the electric car; and a control unit that controls at least the switching unit, and the control unit is configured to perform an on/off control of the switching unit and the electric-power conversion device based on at least two different physical parameters indicating a level of a contact state between the overhead conductor portion and the contact conductor portion.

2. The electric railway system according to claim 1, wherein the on/off control of the switching unit and the electric-power conversion device by the control unit is performed only when the electric car is stopped.

3. The electric railway system according to claim 2, wherein the electric car further comprises a voltage detector that detects a voltage applied from the overhead conductor portion via the contact conductor portion of the power collector, and the control unit performs the on/off control of the switching unit and the electric-power conversion device using a voltage detected by the voltage detector as one of the physical parameters.

4. The electric railway system according to claim 2, wherein the electric car further comprises a voltage detector that detects a voltage applied from the overhead conductor portion via the contact conductor portion of the power collector, and the control unit performs an on/off control of the switching unit and the electric-power conversion device using a change rate of a voltage calculated based on a voltage detected by the voltage detector as one of the physical parameters.

5. The electric railway system according to claim 2, wherein when the electric-power conversion device comprises an input filter that includes a reactor and a capacitor at an input side, the control unit performs an on/off control of the switching unit and the electric-power conversion device using a change rate of a voltage applied to the reactor as one of the physical parameters instead of using the voltage itself.

6. The electric railway system according to claim 2, wherein the power collector comprises a state detector that detects whether the overhead conductor portion is in contact with the contact conductor portion, and the control unit performs an on/off control of the switching unit and the electric-power conversion device using a detection signal of the state detector as one of the physical parameters.

7. The electric railway system according to claim 2, wherein the power collector comprises a temperature detector that detects a temperature of the contact conductor portion, and the control unit performs an on/off control of the switching unit and the electric-power conversion device using a detection signal detected by the temperature detector as one of the physical parameters.

8. The electric railway system according to claim 1, wherein when the electric-power conversion device comprises an input filter including a reactor and a capacitor at an input side, the control unit performs an on/off control of the switching unit and the electric-power conversion device using a voltage applied to the reactor as one of the physical parameters.

9. The electric railway system according to claim 1, wherein the power collector comprises a state detector that detects whether the overhead conductor portion is in contact with the contact conductor portion, and the control unit prohibits running of the electric car when a detection signal detected by the state detector is a signal indicating that the overhead conductor portion is in contact with the contact conductor portion is continued even when an instruction to lower the contact conductor portion is input to the power collector.

10. The electric railway system according to claim 1, wherein the control unit comprises a compulsory-lower control unit that controls the lowering of the power collector, and a delay circuit that delays an output of the compulsory-lower control unit, and the control unit turns off the switching unit and the electric-power conversion device to off and lowers the power collector with a delay, when the electric car moves during an electric charge to the electric car with the power collector being in a raised position.

11. The electric railway system according to claim 1, wherein the power collector comprises a position detector that detects contact between the contact conductor portion and the overhead conductor portion, and the overhead conductor portion is configured to be electrically connected to the power source when a lifting amount from the power collector is equal to or larger than a predetermined value.

12. The electric railway system according to claim 1, wherein plural overhead conductor portions are provided in parallel such that the overhead conductor portions are in contact with contact conductor portions at a plurality of positions.

13. The electric railway system according to claim 1, wherein plural contact conductor portions are provided in the power collector such that the contact conductor portions are in contact with overhead conductor portions at a plurality of positions.

14. The electric railway system according to claim 1, wherein an overhead conductor portion provided in a normal electrified section is different from an overhead conductor portion provided in a rapid electric-charge section.

15. The electric railway system according to claim 1, wherein the at least two different physical parameters include a temperature and a raise/lower state of the contact conductor portion.

16. The electric railway system according to claim 1, wherein the at least two different physical parameters include a temperature and a voltage.

17. The electric railway system according to claim 1, wherein the at least two different physical parameters include a voltage and a raise/lower state of the contact conductor portion.

18. A propulsion system of an electric car comprising:
- a switching unit that performs opening and closing of a main circuit that is an electric path from a power source which supplies the electric car with electric power;
- an electric-power conversion device that is connected to the switching unit and performs an electric power conversion;
- an electric-power storage device that is connected to the electric-power conversion device and stores electric power;
- an electric motor that is driven by the electric-power conversion device and drives the electric car; and
- a control unit that controls at least the switching unit, wherein
- the switching unit is connected to a power collector that has a contact conductor portion contactable to an overhead conductor portion, and is capable of performing a raising operation and a lowering operation of the contact conductor portion based on an instruction, and
- the control unit is configured to perform an on/off control of the switching unit and the electric-power conversion device based on at least two different physical parameters indicating a level of a contact state between the overhead conductor portion and the contact conductor portion.

19. The propulsion system according to claim 18, wherein the at least two different physical parameters include a temperature and a raise/lower state of the contact conductor portion.

20. The propulsion system according to claim 18, wherein the at least two different physical parameters include a temperature and a voltage.

21. The propulsion system according to claim 18, wherein the at least two different physical parameters include a voltage and a raise/lower state of the contact conductor portion.

* * * * *